(No Model.)

L. P. THOMAS.
BEAN PLANTER.

No. 468,977. Patented Feb. 16, 1892.

WITNESSES:
Grace G. Chapman
Adolph B. Mason

INVENTOR
Lyndsey P. Thomas
BY
Cyrus E. Perkins
ATTORNEY.

UNITED STATES PATENT OFFICE.

LYNDSEY P. THOMAS, OF CANNON, MICHIGAN.

BEAN-PLANTER.

SPECIFICATION forming part of Letters Patent No. 468,977, dated February 16, 1892.

Application filed October 6, 1891. Serial No. 407,928. (No model.)

*To all whom it may concern:*

Be it known that I, LYNDSEY P. THOMAS, a citizen of the United States, residing at Cannon, in the county of Kent and State of Michigan, have invented certain new and useful Improvements in Bean-Planters; and I do declare the following to be a full, clear, and exact description of the invention, such as will enable others skilled in the art to which it appertains to make and use the same, reference being had to the accompanying drawings, and to the letters of reference marked thereon, which form a part of this specification.

Figure 1:
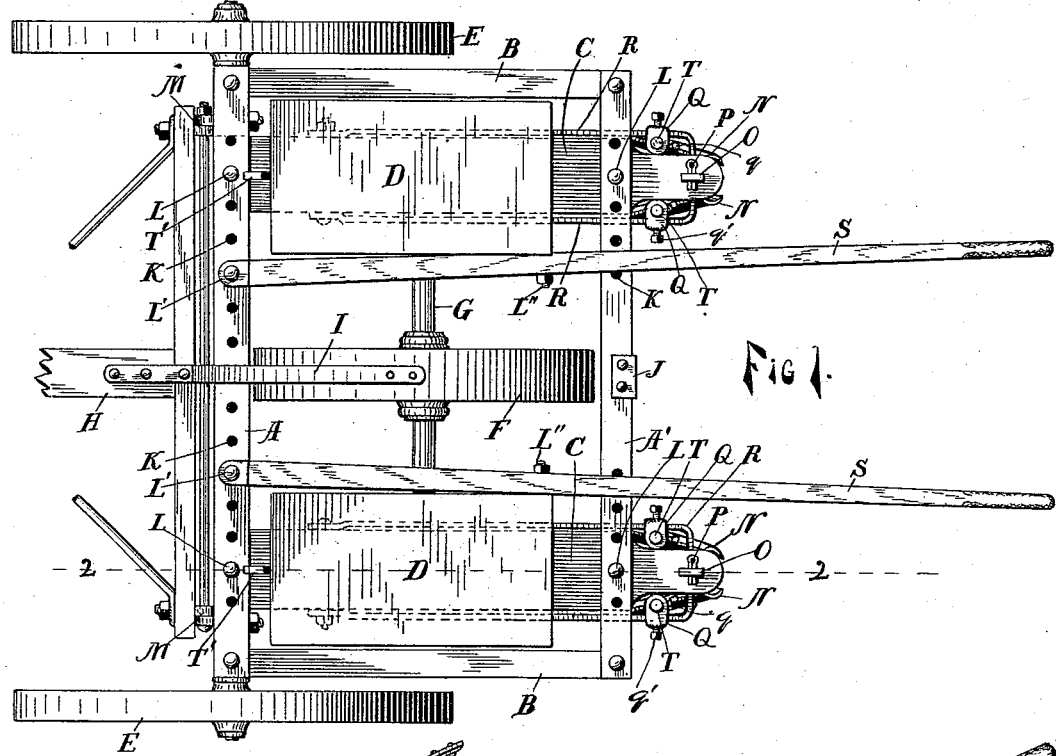
Figure 2:
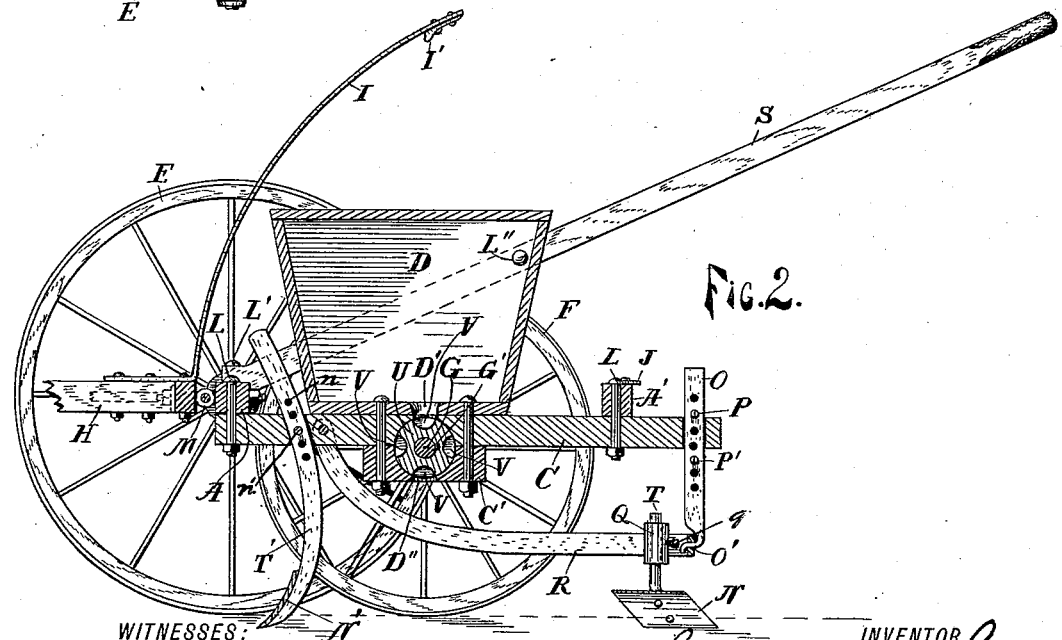

Figure 1 of the drawings is a plan view, and Fig. 2 is a sectional view on the line 2 2 of Fig. 1.

My invention relates to bean and other planters, and especially to that class which plant the seed in rows.

It consists in the improved construction and combination of parts herein described, and particularly pointed out in the claims, whereby the adjustability of the various parts, as well as a simple and economical organization of the machine, is obtained.

As shown in the drawings, A and A' are the front and rear beams, and B B are connecting side bars, of the main frame of the machine. C C are beams supporting the seed-hoppers D D and are fastened to the front and rear beams by bolts L, the said beams being pierced by holes K at regular intervals, so that the distance between the hoppers may be regulated, according to the width of rows desired.

E E are side wheels supporting the planter.

F is a central wheel on axle G.

Beneath the beams C C are short blocks C' C', suitably bolted thereto, through which passes the axle G, bearing at each end the seed-wheel U, made rigid thereon by key-pin G', the said wheel having on its periphery the seed-cups V V V V, and so adjusted that as the axle G revolves the wheel U turns, bringing said cup successively in connection with perforations D' in bottom of hoppers to receive the seed and on the half-revolution of said wheels dropping the seed through aperture D''. In front of said seed-wheels and in line therewith are suitable furrow-openers T' T', having plow-points N' N'. The said furrow-openers are adjustably secured to the beams C C by means of a series of holes $n$ in the shank of the openers and a bolt $n'$ engaging said holes and the beams.

Hung upon the forward end of beams C C are the bail-shaped shovel-carriers R R, having holes in the bail ends, the rods O O, terminating in lugs O' O', fitting in said holes and passing up through the rear ends of beams C C and being perforated with numerous holes to receive pins P P and P' P', the purpose of pins P P being to hold up the carriers where the soil is light and of P' P' to hold them down where the soil is heavy. Upon said carriers are hung the shovels N N N N, having the shanks T, which are rotatable in the sliding blocks Q Q Q Q and held therein by set-screws $q$, so that they may be secured in place at any angle desired. The sliding blocks Q Q are also each held in position on the carriers by set-screws $q'$, so that shovels may be placed opposite each other or one in advance of the other, as the character of the soil may render desirable.

The implement, as shown, is provided with a tongue H, hung upon front beam A by hinge-bolts M M, and securely fastened upon said tongue is the steel arm I, having on its upper end the lug I', adapted to engage the catch-piece J on rear beam when rear end of implement is thrown up. The planter is then out of gear, as is often desirable.

S S are handles adjustably fastened to the front beam by bolts L' L' and to seed-boxes by bolts L'' L''.

Having thus described my invention, what I claim as new, and desire to secure by Letters Patent, is—

1. In a planter, the main frame, the beams C C, laterally adjustable in said frame, hoppers D D, supported on said beams, the axle G, carrying the seed-dropping devices, wheel F on said axle, and plows N' and shovels N, secured to the beams C C, the said plows being vertically adjustable and the shovels vertically and circularly adjustable, in combination, substantially as shown and described.

2. In a planter, the combination, with the main frame, of the laterally-adjustable beams C C, each having the bail R hinged thereto, the shovel N on said bail, the rod O, having its lower end connected with the bail and its upper end provided with a series of holes and extending through the frame, and the pins P P', adapted to engage said holes and also both sides of the frame, substantially as shown, and for the purpose described.

In testimony whereof I affix my signature in presence of two witnesses.

LYNDSEY P. THOMAS.

Witnesses:
ADOLPH B. MASON,
GRACE G. CHAPMAN.